(12) United States Patent
Vendas Da Costa et al.

(10) Patent No.: US 11,436,807 B2
(45) Date of Patent: Sep. 6, 2022

(54) SYSTEM AND METHOD OF OPERATION FOR REMOTELY OPERATED VEHICLES WITH IMPROVED POSITION ESTIMATION

(71) Applicant: Abyssal S.A., Matosinhos (PT)

(72) Inventors: Pedro Miguel Vendas Da Costa, Oporto (PT); Manuel Alberto Parente Da Silva, Maia (PT)

(73) Assignee: ABYSSAL S.A., Matosinhos (PT)

( * ) Notice: Subject to any disclaimer, the term of this patent is extended or adjusted under 35 U.S.C. 154(b) by 0 days.

(21) Appl. No.: 17/266,030

(22) PCT Filed: Aug. 8, 2018

(86) PCT No.: PCT/IB2018/055976
§ 371 (c)(1),
(2) Date: Feb. 4, 2021

(87) PCT Pub. No.: WO2020/030948
PCT Pub. Date: Feb. 13, 2020

(65) Prior Publication Data
US 2021/0295605 A1  Sep. 23, 2021

(51) Int. Cl.
*G06T 19/00* (2011.01)
*G06T 7/37* (2017.01)
(Continued)

(52) U.S. Cl.
CPC .............. *G06T 19/006* (2013.01); *G06T 7/37* (2017.01); *G06T 19/20* (2013.01); *H04N 5/2226* (2013.01);
(Continued)

(58) Field of Classification Search
None
See application file for complete search history.

(56) References Cited

U.S. PATENT DOCUMENTS 10,007,269 B1  6/2018  Gray
10,394,327 B2  8/2019  Chizeck
(Continued)

FOREIGN PATENT DOCUMENTS

EP   0674977 A1  10/1995
FR   2949167 A1   2/2011
WO   2013/068821 A2  5/2013

OTHER PUBLICATIONS

International Search Report and Written Opinion received for PCT Patent Application No. PCT/US2018/055979, dated Mar. 7, 2019; 13 pages, dated Mar. 7, 2019.

(Continued)

*Primary Examiner* — Robert J Craddock
(74) *Attorney, Agent, or Firm* — Baker Botts L.L.P.

(57) ABSTRACT

The present invention provides a system and method of position estimation for remotely operated vehicles, even in noisy environments. In some embodiments, a position estimation engine includes a 2D projection module, a registration module, a position estimation module, and an efficiency module. The improved position estimation starts with a real frame from a video and a virtual image that is the projection of the 3D elements given the ROV's noisy position. The position estimate begins by projecting each of the visible structures individually and then registers them with the real image. Then the 2D transformation resulting from the registration process is used to estimate the 3D ROV's position. Then, the ROV's position estimates are robustly combined. Because this position estimation needs to run in real-time or near real-time, an efficiency module improves the efficiency of the position estimation.

21 Claims, 17 Drawing Sheets

(51) Int. Cl.
*G06T 19/20* (2011.01)
*H04N 5/222* (2006.01)

(52) U.S. Cl.
CPC ............. *G06T 2207/30252* (2013.01); *G06T 2219/2004* (2013.01)

(56) References Cited

U.S. PATENT DOCUMENTS

| | | |
|---|---|---|
| 2014/0316611 A1 | 10/2014 | Parente Da Silva |
| 2019/0147220 A1 | 5/2019 | Mccormac et al. |
| 2020/0041276 A1 | 2/2020 | Chakravarty et al. |
| 2020/0292817 A1 | 9/2020 | Jones |
| 2021/0304430 A1 | 9/2021 | Vendas Da Costa |
| 2022/0005332 A1 | 1/2022 | Metzler |

OTHER PUBLICATIONS

International Search Report and Written Opinion received for PCT Patent Application No. PCT/US2018/055976, dated Feb. 22, 2019; 11 pages, dated Feb. 22, 2019.

International Search Report and Written Opinion received for PCT Patent Application No. PCT/US2018/055977, dated Apr. 9, 2019; 21 pages, dated Apr. 9, 2019.

International Search Report and Written Opinion received for PCT Patent Application No. PCT/US2018/055978, dated Feb. 22, 2019; 12 pages, dated Feb. 22, 2019.

Kalwa, J. et al., "The MORPH Project: Actual Results," Oceans 2015—Genova, IEEE, May 18, 2015, 8 pages, May 18, 2015.

Eckstein, Sebastian et al., "Towards Innovative Approaches of Team-Oriented Mission Planning and Mission Languages for Multiple Unmanned Marine Vehicles in Event-Driven Mission," MTS/IEEE Oceans, Bergen, Jun. 2013, 8 pages, Jun. 2013.

Vijayanarasimhan, Sudheendra, et al., "SfM-Net: Learning of Structure & Motion from Video," retrieved from the internet on Feb. 21, 2019, URL: https://arxiv.org/pdf/1704.07804.pdf, 5 pages, Feb. 21, 2019.

Bruno, Fabio, et al., "Virtual and Augmented Reality Tools to Improve the Exploitation of Underwater Archaeological Sites by Diver and Non-diver Tourists," International Conference on Simulation, Modeling, and Programming for Autonomous Robots, SIMPAR 2010, Oct. 31, 2016, 12 pages, Oct. 31, 2016.

Marchand, Eric, et al., "Pose Estimation for Augmented Reality: A Hands-On Survey," IEEE Transactions on Visualization and Computer Graphics, vol. 22, No. 12, Dec. 1, 2016, 19 pages, Dec. 1, 2016.

Vlahakis, Vassilio et al., "Archeoguide: an augmented reality guide for archaeological sites," IEEE Computer Graphics and Applications, vol. 22, No. 5, Sep. 1, 2002, 9 pages, Sep. 1, 2002.

Sharma, Ojaswa et al., "Navigation in AR based on digital replicas," The Visual Computer, Springer, Berlin, DE, vol. 34, No. 6, May 2, 2018, 12 pages, May 2, 2018.

Reitmayr, Gerhard et al., "Going out," Mixed and Augmented Reality, ISMAR 2006. IEEE/ACM International Symposium On, IEEE, PI, Oct. 22, 2006 , 10 pages, Oct. 22, 2006.

Tzafestas, Costas S., "Virtual and Mixed Reality in Telerobotics: A Survey," Industrial Robotics—Programming, Simulation and Application, Jan. 1, 2006, 34 pages, Jan. 1, 2006.

O'Byrne, Michael et al., "Semantic Segmentation of Underwater Imagery Using Deep Networks Training in Synthetic Imagery," Journal of Marine Science and Engineering, vol. 6, No. 3, Aug. 3, 2018, 15 pages, Aug. 3, 2018.

Choi, S.K., et al., "Distributed Virtual Environment Collaborative Simulator for Underwater Robots," Proceedings of the 2000 IEEE/RSJ International Conference on Intelligent Robots and Systems, Oct. 2000, 6 pages, Oct. 2000.

Baraldi et al., "LAMV: Learning to align and match videos with kemelized temporal layers," Facebook AI Research, Jun. 19, 2018, URL:https://ai.facebook.com/results/?content_types%5B0%5D=publication&page=10&years%5B0%5D=2018 (Year 2018), 2018.

SYSTEM AND METHOD OF OPERATION FOR REMOTELY OPERATED VEHICLES WITH IMPROVED POSITION ESTIMATION

CROSS-REFERENCE TO RELATED APPLICATIONS

This application is a U.S. National Stage Application of International Application No. PCT/IB2018/055976 filed Aug. 8, 2018, which designates the United States.

The disclosures of published patent documents referenced in this application are hereby incorporated in their entireties by reference into this application in order to more fully describe the state of the art to which this invention pertains.

The present invention relates to a system of operation for remotely operated vehicles ("ROV"), and methods for its use. In particular, the present invention provides a system and method of operation for ROVs with improved position estimation.

BACKGROUND OF THE INVENTION

Exploration of the last frontier on earth, the sea, is largely driven by the continuing demand for energy resources. Because humans are not able to endure the pressures induced at the depths at which energy reconnaissance occurs, we have become increasingly reliant upon technology such as autonomous vehicles and ROV technology. The future of the exploration of the oceans is only as fast, reliable and safe as the available technology. Thus, new innovations in exploration are needed.

SUMMARY OF THE INVENTION

The Oil and Gas (O&G) industry has subsea fields that need to be maintained. For security reasons, maintenance operations are performed by Remotely Operated Vehicles (ROVs). These ROVs can be used for construction, repairing, routine operations or visual inspection of the subsea structures.

However, visibility is typically poor in underwater environments, especially in vicinity to the seafloor due to floating sediment. To minimize this issue, Augmented Reality (AR) can be used to superimpose 3D models of the subsea structures with the video feed. This way, even if the structures cannot be seen in the video due to poor visibility, a virtual representation of the structure is displayed in the correct position, helping the pilot to navigate properly.

The structures' appearance as well as their position is known and, therefore, a 3D model of the field can be built before the start of a subsea mission. Moreover, ROVs contain sensors that output their position and depth and, as such, can be positioned in the 3D scene. Therefore, it is possible to compute the 3D elements that should be visible in the video, as well as their position.

A problem with this approach is that the ROV's positional telemetry may be noisy, which may lead to a misalignment between the virtual and the real elements.

This disclosure provides systems and methods relating to the operation of ROVs with improved position estimation in noisy environments. Although embodiments and examples are provided in the context of undersea missions, one skilled in the art should appreciate that the aspects, features, functionalities, etc., discussed in this disclosure can also be extended to virtually any type of complex navigation project.

BRIEF DESCRIPTION OF THE DRAWINGS

The aforementioned and other aspects, features and advantages can be better understood from the following detailed description with reference to the accompanying drawings wherein.

DETAILED DESCRIPTION OF THE INVENTION

Figure 1A:
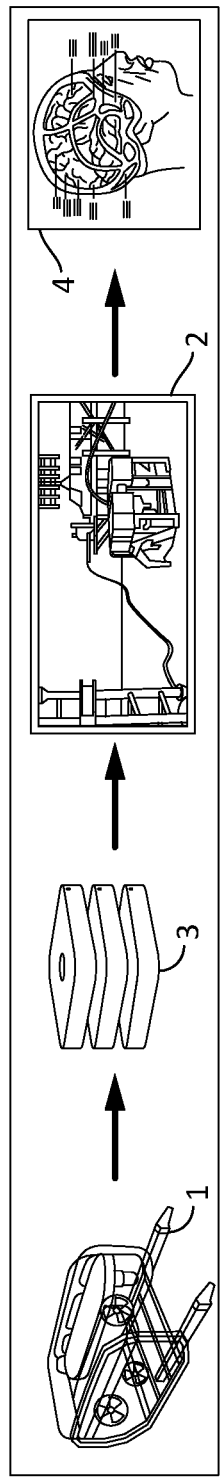
FIG. 1A shows a diagrammatic view of a system, according to some embodiments.

The invention provides a system for operating a remotely operated vehicle (ROV) comprising:

a) a database module of 3D elements operable to represent objects disposed in an operation environment of the ROV;

b) a virtual video generating module operable to generate a virtual video incorporating the 3D elements;

c) a video camera mounted to the ROV operable to capture a real video of the operation environment of the ROV;

d) a synchronizing module operable to synchronize an angle and position of a virtual camera with an angle and position of the video camera mounted to the ROV, wherein the virtual camera defines a field of view for the virtual video; and e) a position estimation engine operable to align a virtual video element with a real video element to create hybrid 3D imagery and generate a ROV position estimation, the position estimation engine comprising: a projection module; a registration module; a position estimation module; and an efficiency module.

The systems and methods described herein may further have one or more of the following features, which may be combined with one another or any other feature described herein unless clearly mutually exclusive.

The projection module may be operable to project visible 3D structures into a corresponding 2D virtual image with a 2D virtual image field-of-view, and each of the visible 3D structures may be projected into its corresponding 2D virtual image.

The 2D virtual image field-of-view may be larger than the field of view for the virtual video.

The projection module may generate N virtual images.

The registration module may register the N virtual images with a real frame from the real video.

The registration module may determine edge maps to register the N virtual images.

The registration module may map at least one virtual edge point to at least one corresponding real edge point with a similarity transformation matrix.

The registration module may generate the similarity transformation matrix in a closed form using Umeyama's method.

The registration module may apply the similarity transformation matrix in an iterative process until the similarity transformation matrix is close to identity or exceeds a maximum number of iterations.

The position estimation module may generate the ROV position estimation based at least in part on the N virtual images of the projection module and the similarity transformation matrix of the registration module.

The position estimation module may determine a rigid body transformation Ti.

The position estimation module may generate a new ROV position estimation by right multiplying a previous ROV position estimation with Ti.

The position estimation module may render 3D structures from the new ROV position estimation.

Before rendering the 3D structures from the new ROV position estimation, the position estimation module may remove outlier position estimations to generate a set of remaining position estimations and determine an updated ROV position estimation comprising a mean of the set of remaining position estimations.

The efficiency module may use a full registration process for a specific structure when (i) a predetermined number of virtual edge points or real edge points are lost, (ii) after a predetermined number of frames, (iii) or when the specific structure enters the real video for a first time.

The invention also provides a method of operating a remotely operated vehicle (ROV) comprising:
a) obtaining 3D bathymetry data using multibeam sonar;
b) storing 3D elements in a database module, the 3D elements representing objects disposed in the ROV's operation environment and comprising the 3D elements comprising the 3D bathymetry data;
c) generating a virtual video of the 3D elements;
d) synchronizing an angle and position of a virtual camera with an angle and position of a video camera mounted to the ROV, wherein the virtual camera defines a field of view for the virtual video; and
e) aligning a virtual video element with a real video element to create hybrid 3D imagery, wherein aligning comprises:
f) projecting visible 3D structures into a corresponding 2D virtual image with a 2D virtual image field-of-view;
g) generating N virtual images;
h) registering the N virtual images with a real frame from the real video; and
i) generating a ROV position estimate based at least in part on the corresponding 2D virtual image and the registered N virtual images.

A method may further comprise using a full registration process for a specific structure.

A method may further comprise:
a) mapping virtual edge points to corresponding real edge points;
b) applying an iterative process to the mapping; and
c) generating a ROV position estimation.

A method may further comprise rendering 3D structures from the ROV position estimation.

A method for generating an ROV position estimation may further comprise:
a) removing outlier position estimations;
b) generating a set of remaining position estimations; and
c) determining an updated ROV position estimation comprising a mean of the set of remaining position estimations.

The invention also provides a computer program product, stored on a computer-readable medium, for implementing any method according to invention as described herein.

As mentioned supra, various features and functionalities are discussed herein by way of examples and embodiments in a context of ROV navigation for use in undersea exploration. In describing such examples and exemplary embodiments, specific terminology is employed for the sake of clarity. However, this disclosure is not intended to be limited to the examples and exemplary embodiments discussed herein, nor to the specific terminology utilized in such discussions, and it is to be understood that each specific element includes all technical equivalents that operate in a similar manner.

Definitions

The following terms are defined as follows:

3D elements; 3D objects—Data defining three-dimensional shapes, obtained by modeling sonar-derived input or user-determined input.

Abstraction; layer of abstraction—A characteristic of executable software, wherein differing data formats are standardized into a common format such that components are made compatible.

Data engine—A collection of modules, according to an embodiment of this invention, which is responsible for at least the acquisition, storing and reporting of data collected over the course of a ROV mission.

Fail state—A state, defined by a user or by a standard, wherein the functionality of the system, according to some embodiments of the invention, has decreased to an unacceptable level.

Luminance threshold—A system-determined value of RGB (Red, Green, Blue) pixel color intensity which defines a visible but transparent state for the images depicted by a digital image output device.

Module—A combination of at least one computer processor, computer memory and custom software that performs one or more defined functions.

Navigation engine—A collection of modules, according to some embodiments of this invention, which is responsible for making the Navigation Interface interactive, and for producing data for displaying on the Navigation Interface.

Positioned; geopositioned; tagged—Having a location defined by the Global Positioning System of satellites and/or acoustic or inertial positioning systems, and optionally having a location defined by a depth below sea level.

Position estimation engine—A collection of modules, according to some embodiments, which is responsible for position estimation.

ROV—A remotely operated vehicle; often an aquatic vehicle. Although for purposes of convenience and brevity ROVs are described herein, nothing herein is intended to be limiting to only vehicles that require remote operation. Autonomous vehicles and semi-autonomous vehicles are within the scope of this disclosure.

Visualization engine—A collection of modules, according to an embodiment of this invention, which is responsible for producing the displayed aspect of the navigation interface.

System

Hardware and Devices

Referring now to the drawings, wherein like reference numerals designate identical or corresponding parts throughout the several views, FIG. 1A diagrammatically depicts a system according to an embodiment of the invention. This system includes an ROV and its associated instrumentation 1, an operating system housed within computer hardware 3 and a user interface and its associated devices 2. The operating system 3 mediates interaction between the ROV 1 and the user 4, such that the user may submit commands and inquiries for information to the ROV 1, and obtain mechanical responses and data output from the ROV 1.

Figure 1B:
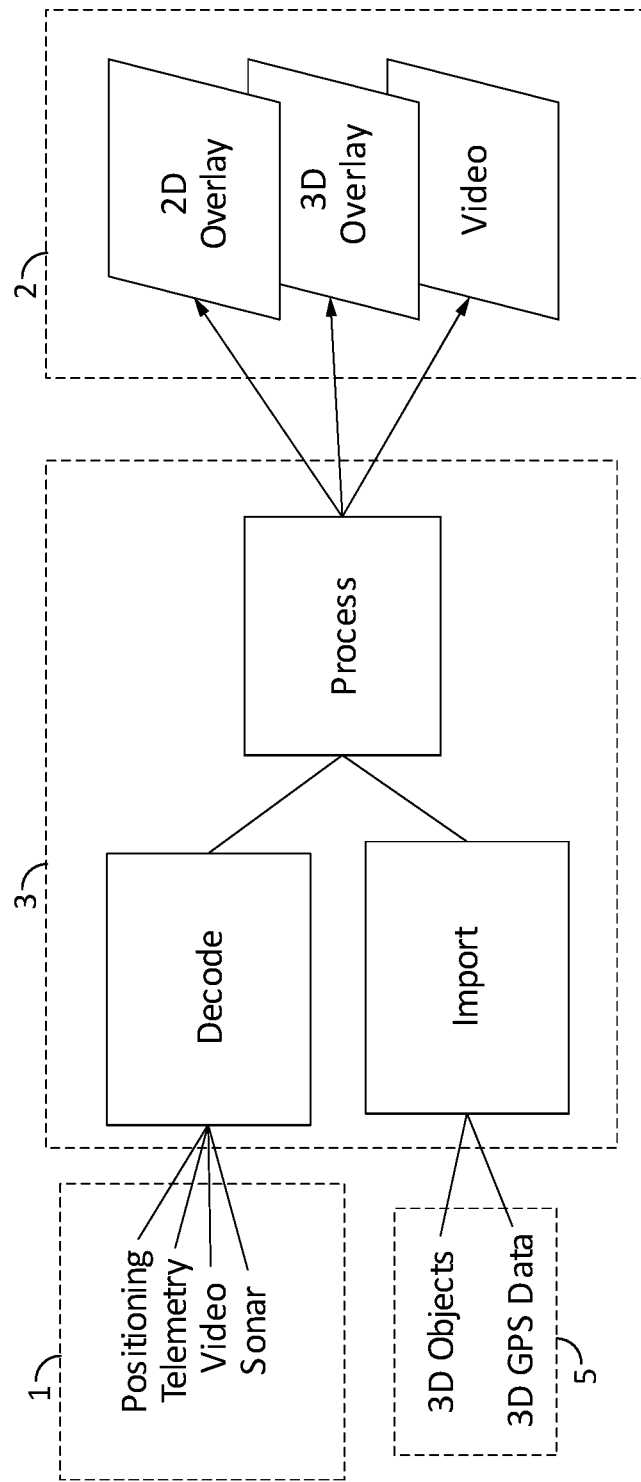
FIG. 1B shows a diagrammatic view of a system and its associated functions, according to some embodiments.

As seen from FIG. 1B, the operating system 3 may receive live information obtained by the ROV's 1 multibeam 3D real-time sonar, telemetry data, positioning data and video as well as programmed 3D objects from a database 5, and process that data to provide live 3D models of the environment for both augmented reality and full 3D rendering displayed at the user interface 2. The user interface 2 may also be used to display video obtained using the ROV's 1 digital instrumentation, including, for example, cameras and other sensors. The ROV 1 utilized in the system of the present invention is equipped with conventional instrumentation for telemetry and positioning, which are responsive to the commands mediated by the operating system 3.

In one embodiment of the invention, the hardware for the operating system 3 includes a high-end rack computer that can be easily integrated with any ROV control system. The several software modules that further define the operating system will be described in further detail infra.

Figure 2A:
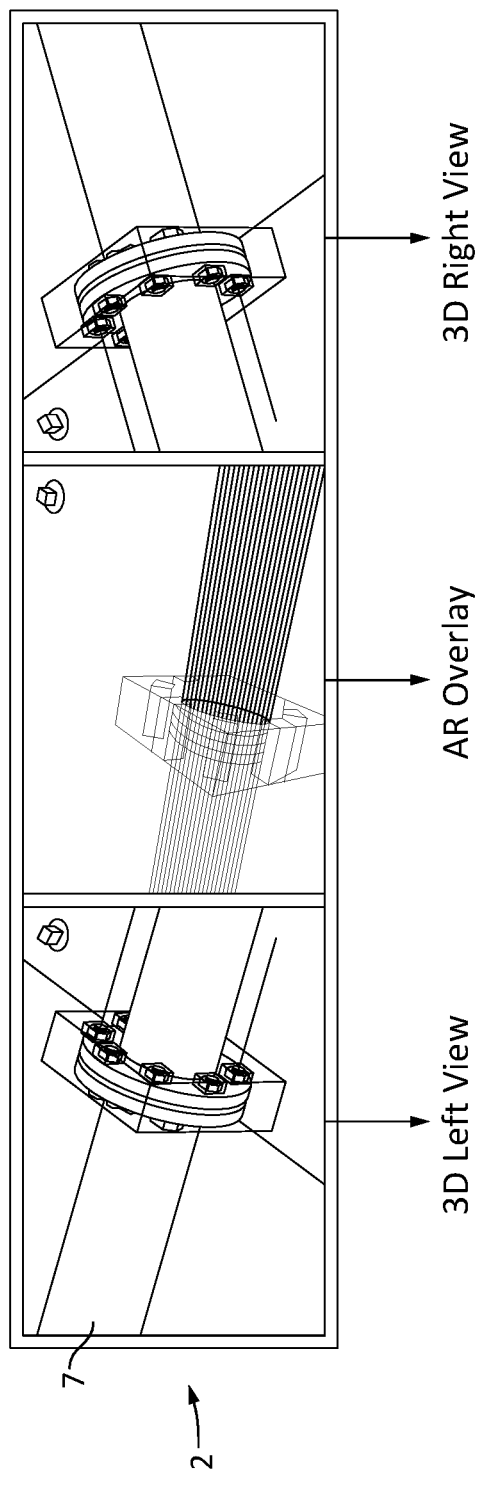
FIGS. 2A and 2B depict alternative views of a user interface of a system according to some embodiments.
Figure 2B:
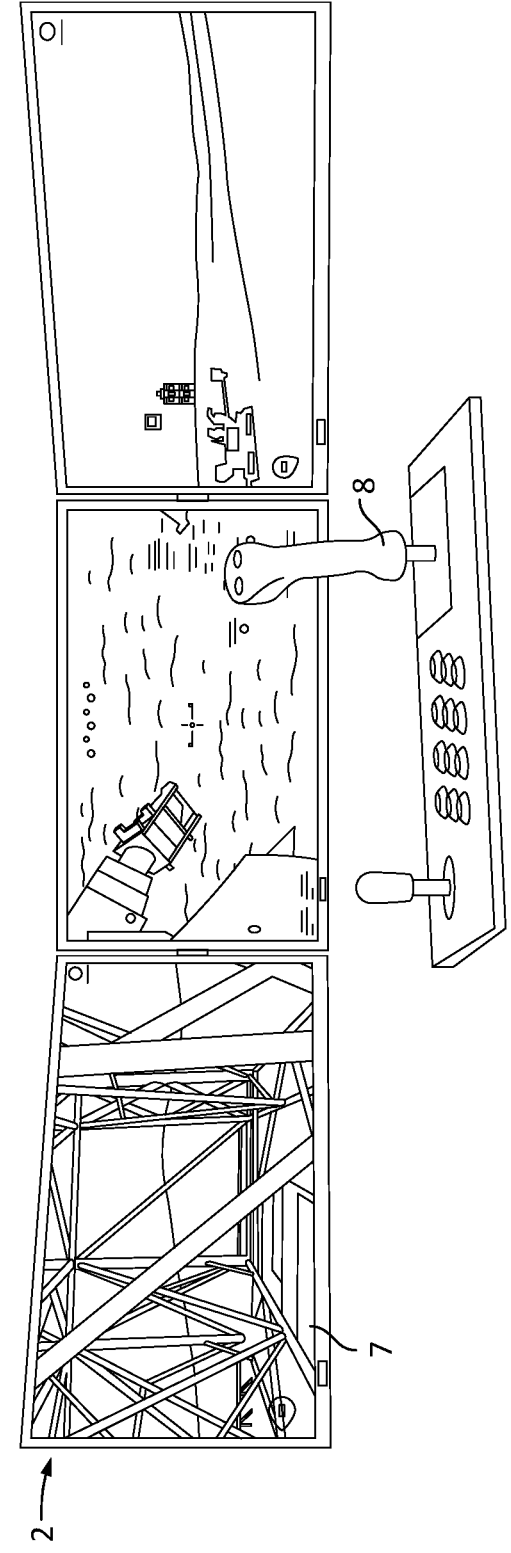

With reference to FIGS. 2A and 2B, the human-machine interface includes at least one monitor 7, and preferably three interactive monitors 7 for navigation. According to one embodiment shown in FIG. 2A, the center monitor 7 provides a video feed and augmented reality (AR), while the side monitors provide an expansion of the field of view of operation. In another aspect, the side monitors may allow the user to have a panoramic view of the ROV environment using full 3D visualization from the point of view of the ROV. As seen in FIG. 2B, the interaction between the user and the system may utilize joysticks 8, gamepads, or other controllers. In another embodiment, the user interface 2 may employ touch or multi-touch screen technology, audio warnings and sounds, voice commands, a computer mouse, etc.

Functional Modules

Rather than developing a different operating system 3 for each brand and model of ROV 1, the embodiments described herein work by abstraction, such that the disclosed operating system 3 and associated hardware work the same way with all ROVs 1. For example, if one component delivers "$DBS, 14.0, 10.3" as a depth and heading coordinates, and another component delivers "$HD, 15.3, 16.4" as heading and depth coordinates, these data strings are parsed into their respective variables: Depth1=14.0, Depth2=16.4, Heading1=16.4, Heading2=15.3. This parsing allows both system to work the same way, regardless of the data format details.

By developing a layer of abstraction of drivers for communication between the operating system 3 and the ROV hardware, the user 4 is provided with seamless data communication, and is not restricted to using particular ROV models. This abstraction further allows users 4 and systems 3 to communicate and network information between several systems, and share information among several undersea projects. The use of a single system also allows for cost reduction in training, maintenance and operation of this system.

Figure 3A:
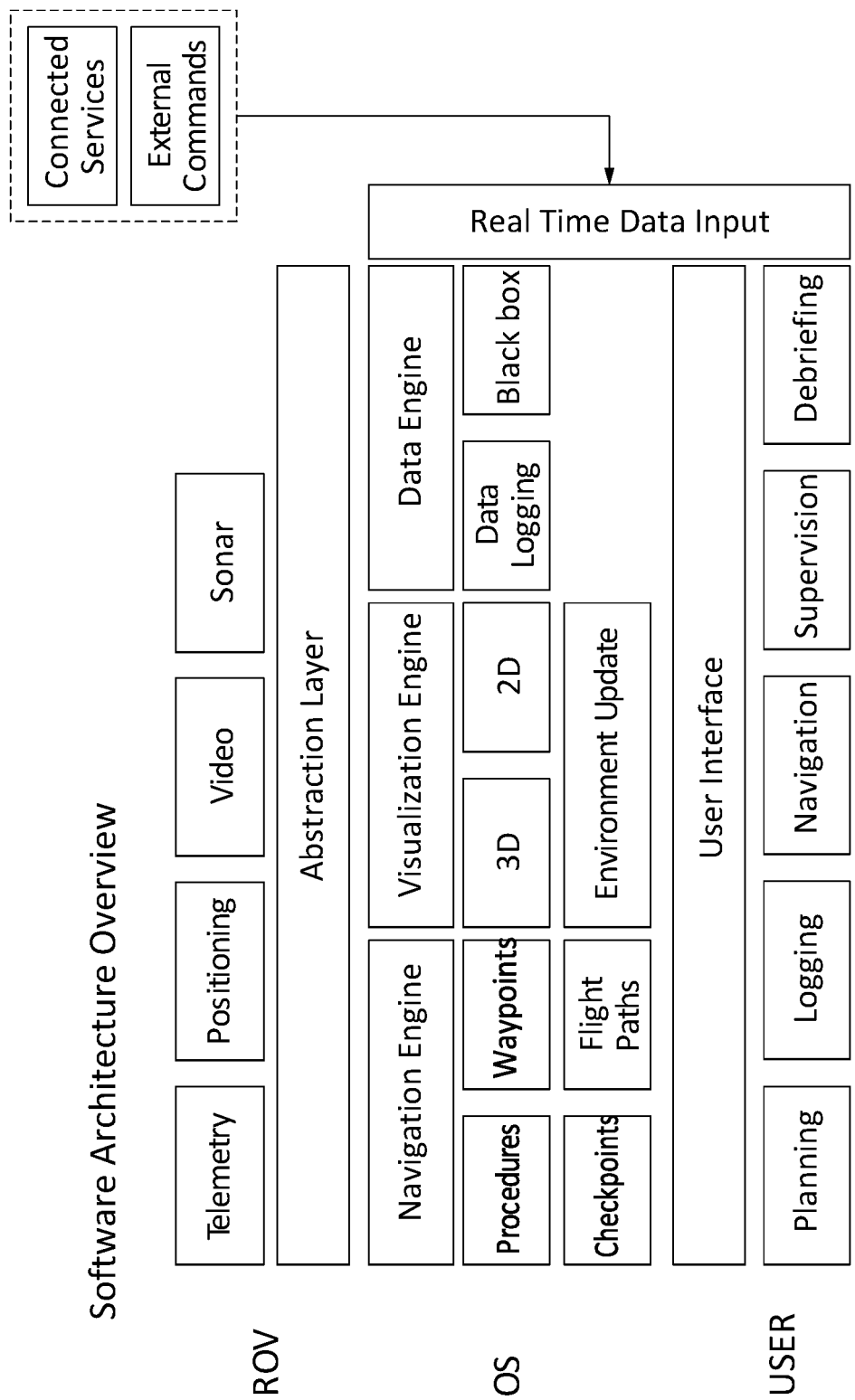
FIGS. 3A and 3B show software architecture overviews of a system, according to some embodiments.

FIG. 3A depicts a software architecture overview illustrating the component parts of the ROV 1, user interface 2 and operating system 3. Software counterparts are provided for the ROV's telemetry, positioning, video and sonar instrumentation. In order to implement user functions including planning, logging, navigation, supervision and debriefing, the operating system 3 provides a navigation engine, a visualization engine and a data engine. The operating system 3 is networked such that connected services and external command units can provide real-time data input. One of such external command units may be configured as a watchdog. The external watchdog system may perform periodic checks to determine whether the system is working properly, or is in a fail state. If the system is in a fail state, the watchdog may change the monitors' inputs, or bypass them, to a conventional live video feed until the system is operating correctly.

Figure 3B:
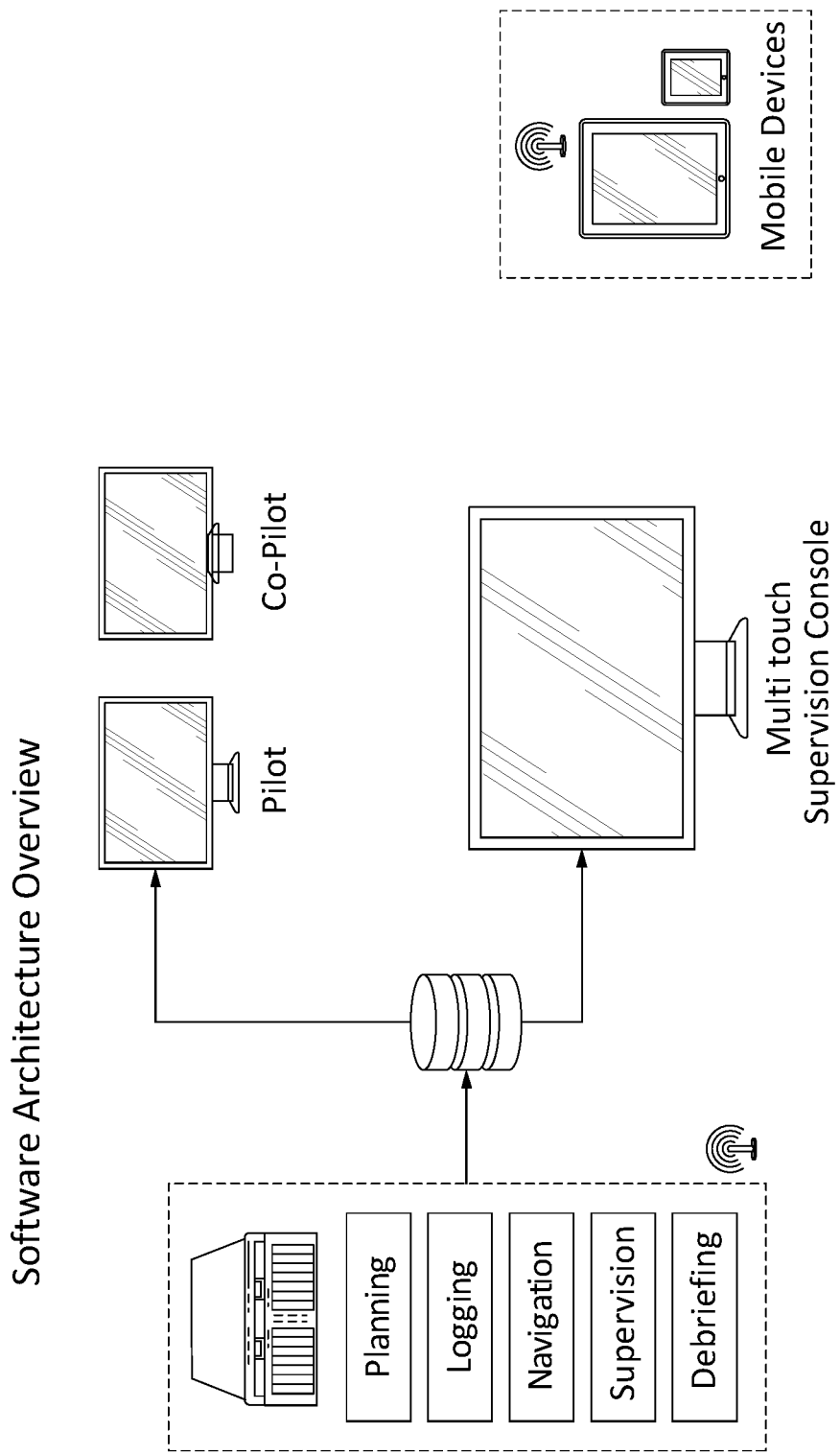
Figure 3C:
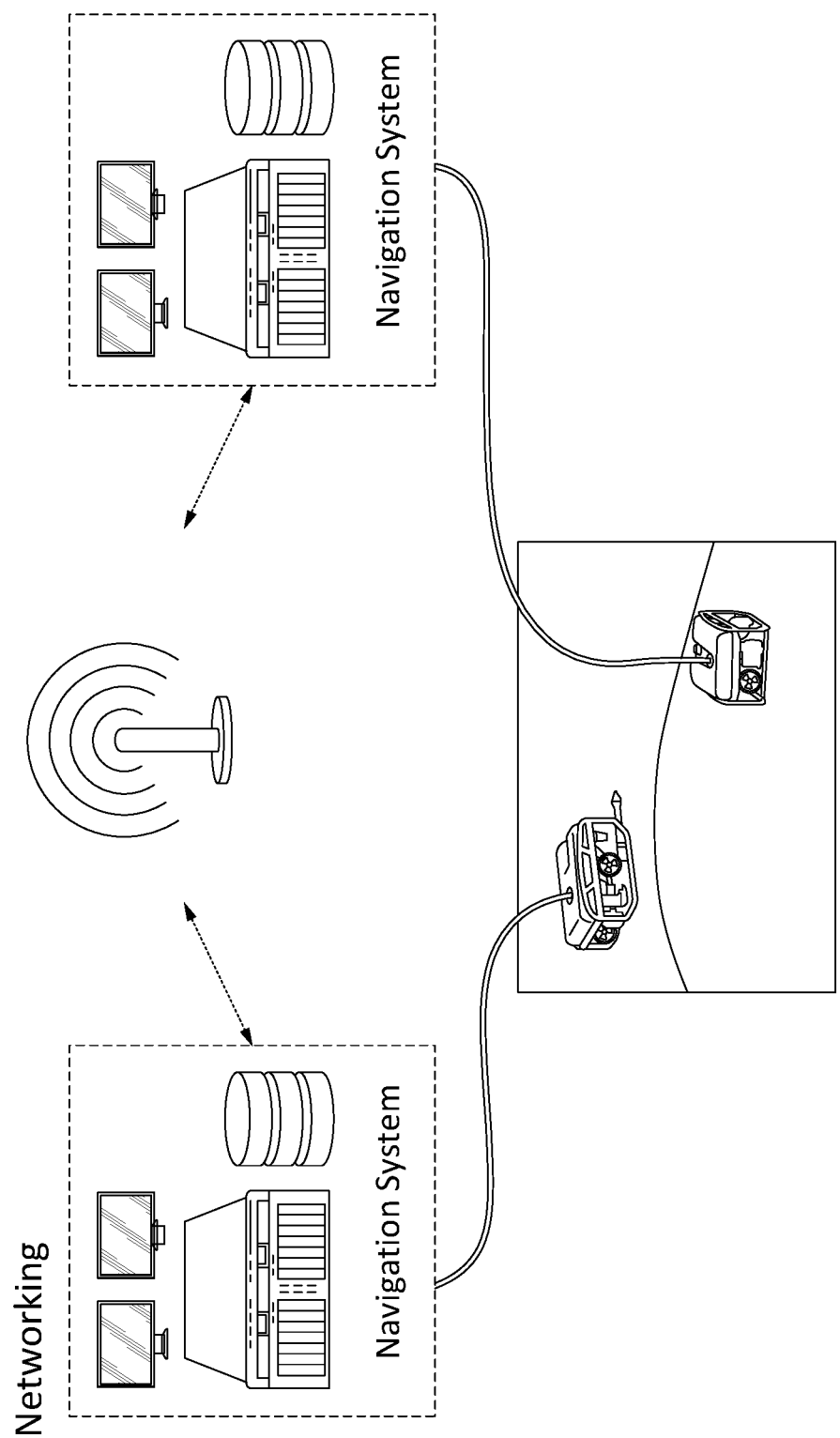
FIG. 3C is a diagrammatic illustration of networked systems, according to some embodiments.

FIG. 3B depicts a further software architecture overview illustrating that the operating system 3, which mediates the aforementioned user functions, is networked to provide communication between a multi touch supervision console and a pilot or pilots. FIG. 3C illustrates yet another level of connectivity, wherein the navigation system of a first ROV may share all of its dynamic data with the navigation system of another ROV over a network.

Visualization Engine

Figure 4:
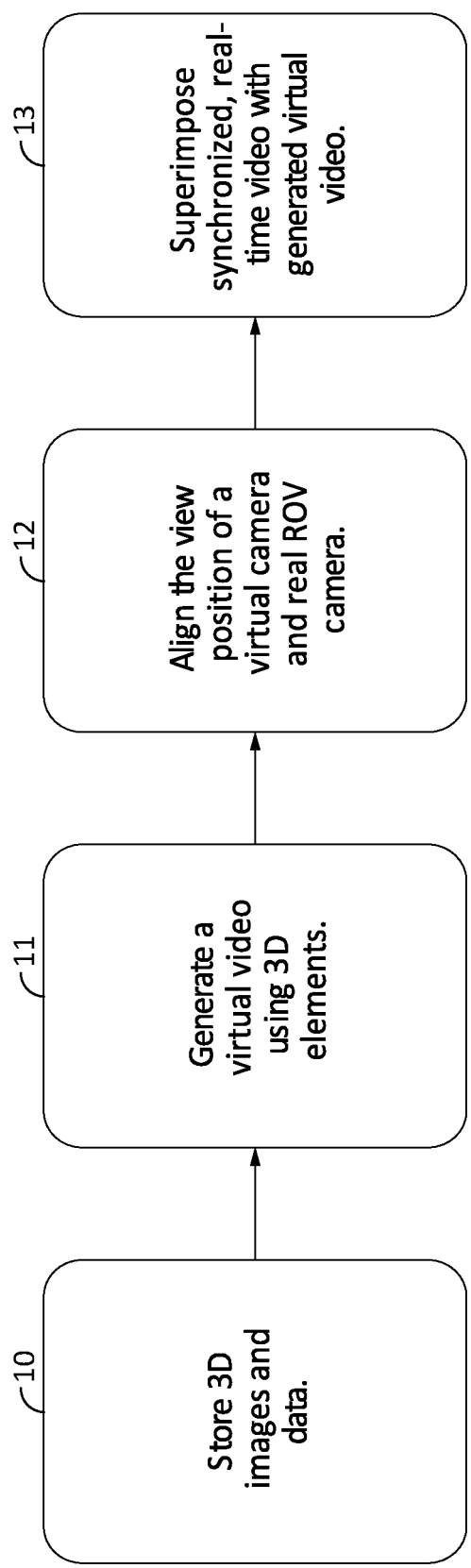
FIG. 4 depicts modules for achieving hybrid 3D imagery, and a method for their use, according to some embodiments.

As seen from FIGS. 1B and 3A, the operating system's 3 visualization engine further includes modules for implementing 3D imagery, two-dimensional ("2D") imagery, and providing a real-time environment update. These modules are shown in FIG. 4, which illustrates in a stepwise fashion how the system operates in some embodiments to create superimposed hybrid 3D imagery.

A 3D database module 10 includes advanced 3D rendering technology to allow all the stages of ROV operation to be executed with reference to a visually re-created 3D deep-water environment. This environment is composed by the seabed bathymetry and modeled equipment, e.g., structures of ocean energy devices.

As discussed above, the main sources of image data may be pre-recorded 3D modeling of sonar data (i.e., computer-generated 3D video) and possibly other video data; live sonar data obtain in real time; video data obtained in real time; user-determined 3D elements; and textual or graphical communications intended to be displayed on the user interface screen. The geographical position and depth (or height) of any elements or regions included in the image data are known by GPS positioning, by use of acoustic and/or inertial positioning systems, and/or by reference to maps, and/or by other sensor measurements.

In some embodiments, a virtual video generation module 11 is provided for using the aforementioned stored 3D elements or real-time detected 3D elements to create a virtual video of such 3D elements. The virtual video generation module 11 may work in concert with a synchronization module 12.

The synchronization module 12 aligns the position of the virtual camera of the virtual video with the angle and position of a real camera on an ROV. According to some embodiments the virtual camera defines a field of view for the virtual video, which may extend, for example, between 45 and 144 degrees from a central point of view.

Figure 5A:
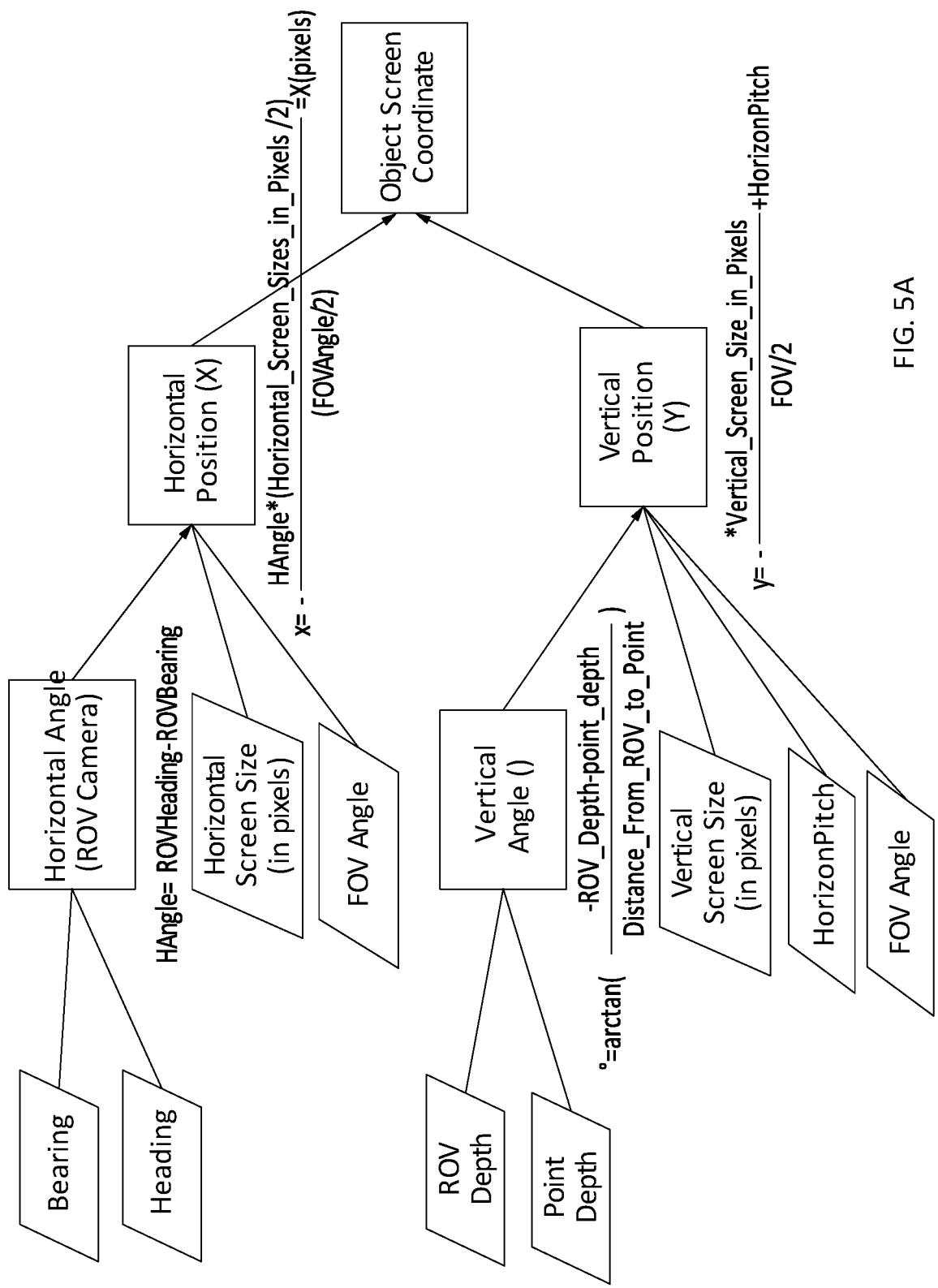
FIG. 5A illustrates calculations for aligning a virtual video and a real video, according to some embodiments.

As illustrated in FIG. 5A, the alignment of virtual and real camera angles may be accomplished by calculating the angle between the heading of the ROV and the direction of the camera field of view; calculating the angle between the vertical of the ROV and the direction of the camera field of view; and calculating the angle between the ROV and the geographic horizon. These calculated angles are then used to determine an equivalent object screen coordinate of the digital X-Y axis at determined time intervals or anytime a variable changes value.

Figure 5B:
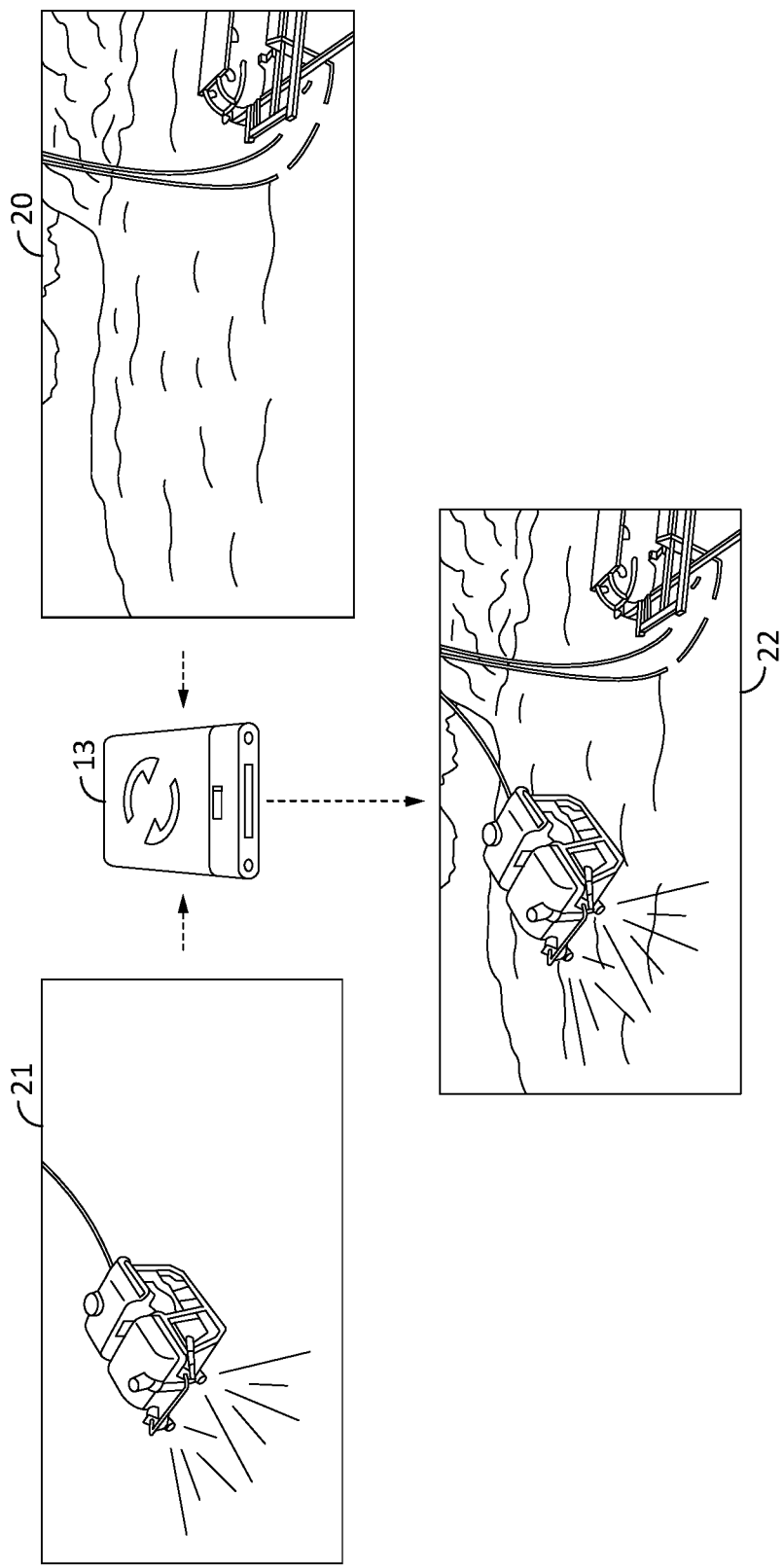
FIG. 5B illustrates hybrid 3D imagery obtained by superimposing a virtual video and a real video, according to some embodiments.

A superimposition module 13, whose function is additionally diagrammed in FIG. 5B, is provided for superimposing the generated virtual video 20 and the synchronized, real-time video 21 acquired by the ROV's digital camera. The result is hybrid superimposed 3D imagery 22, wherein the system effectively draws the generated 3D environment on top of the non-visible part of the video feed, thus greatly enhancing visibility for the ROV pilot. More specifically, the superimposition software divides the camera-feed video and the generated 3D video into several layers on the z-buffer of the 3D rendering system. This permits the flattening of the layers and their superimposition, which simulates spatial perception and facilitates navigation.

Yet another feature of the superimposition module 13 is that either one or both of the virtual 20 or real videos 21 may be manipulated, based upon a luminance threshold, to be more transparent in areas of lesser interest, thus allowing the corresponding area of the other video feed to show through. According to some embodiments, luminance in the Red-Green-Blue hexadecimal format may be between 0-0-0 and 255-255-255, and preferably between 0-0-0 and 40-40-40. Areas of lesser interest may be selected by a system default, or by the user. The color intensity of images in areas of lesser interest is set at the luminance threshold, and the corresponding region of the other video is set at normal luminance. For the example shown in FIG. 5B, the background of the virtual video 20 is kept relatively more transparent than the foreground. Thus, when the real video 21 is superimposed on the virtual 3D image 20, the real video 21 is selectively augmented primarily with the virtual foreground, which contains a subsea structure of interest.

Navigation Engine

The on-screen, 2D Navigation Interface for the ROV pilot involves superimposing geopositioned data or technical information on a 2D rendering system. Geopositioning or geo-tagging of data and elements is executed by reference to maps or to global positioning satellites. The resulting Navigation Interface, as seen in FIGS. 6A-6D, is reminiscent of aviation-type heads up display consoles. In the case of subsea navigation, the display is configured to indicate ROV 1 position based on known coordinates, and by using a sonar system that records 3D images from a ROV's position for later navigation. In this way, the embodiments described herein provide immersive visualization of ROV's operation.

Figure 6A:
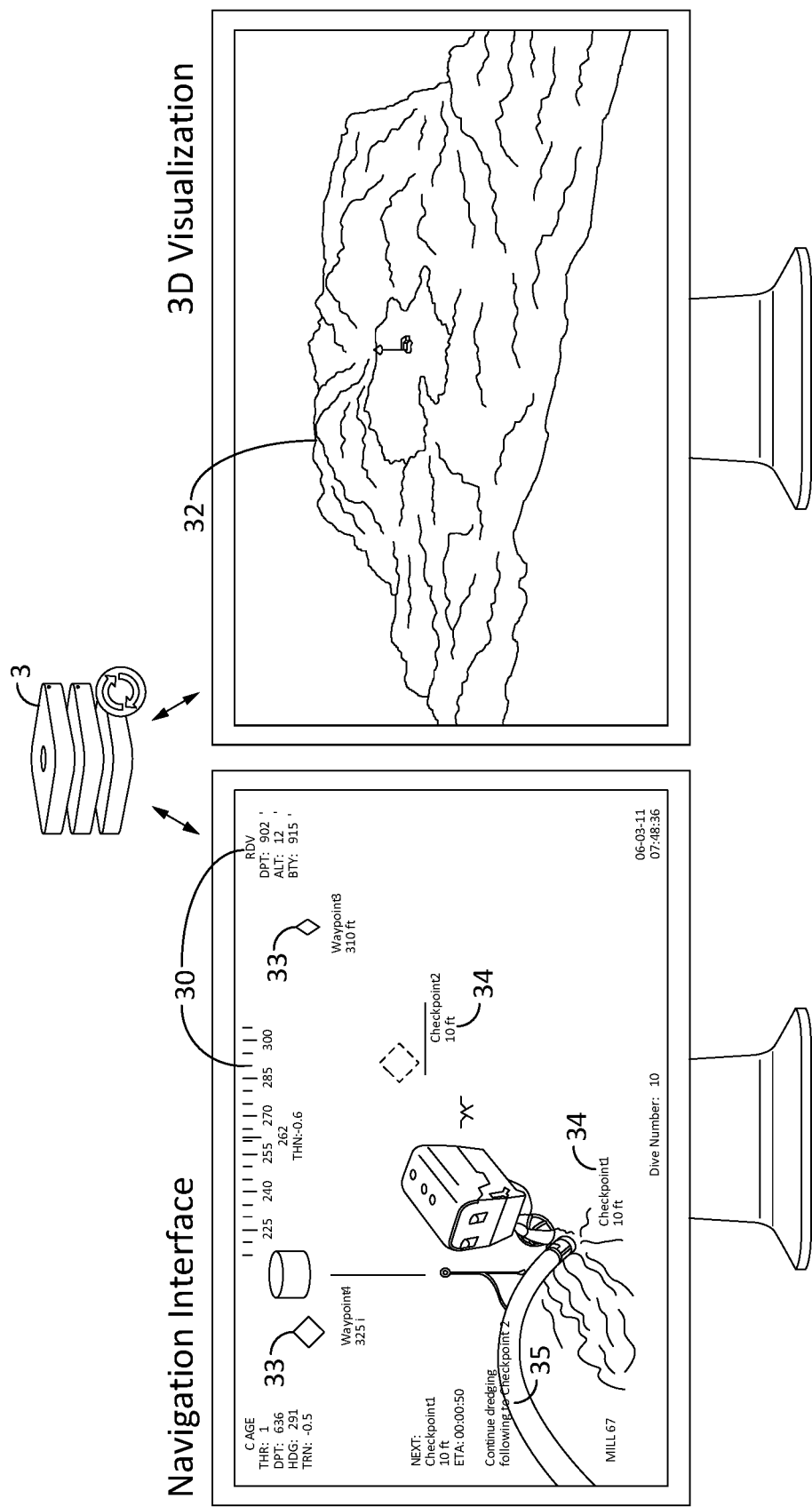
FIGS. 6A-6E depict several views of a navigation interface, according to some embodiments.
Figure 6B:
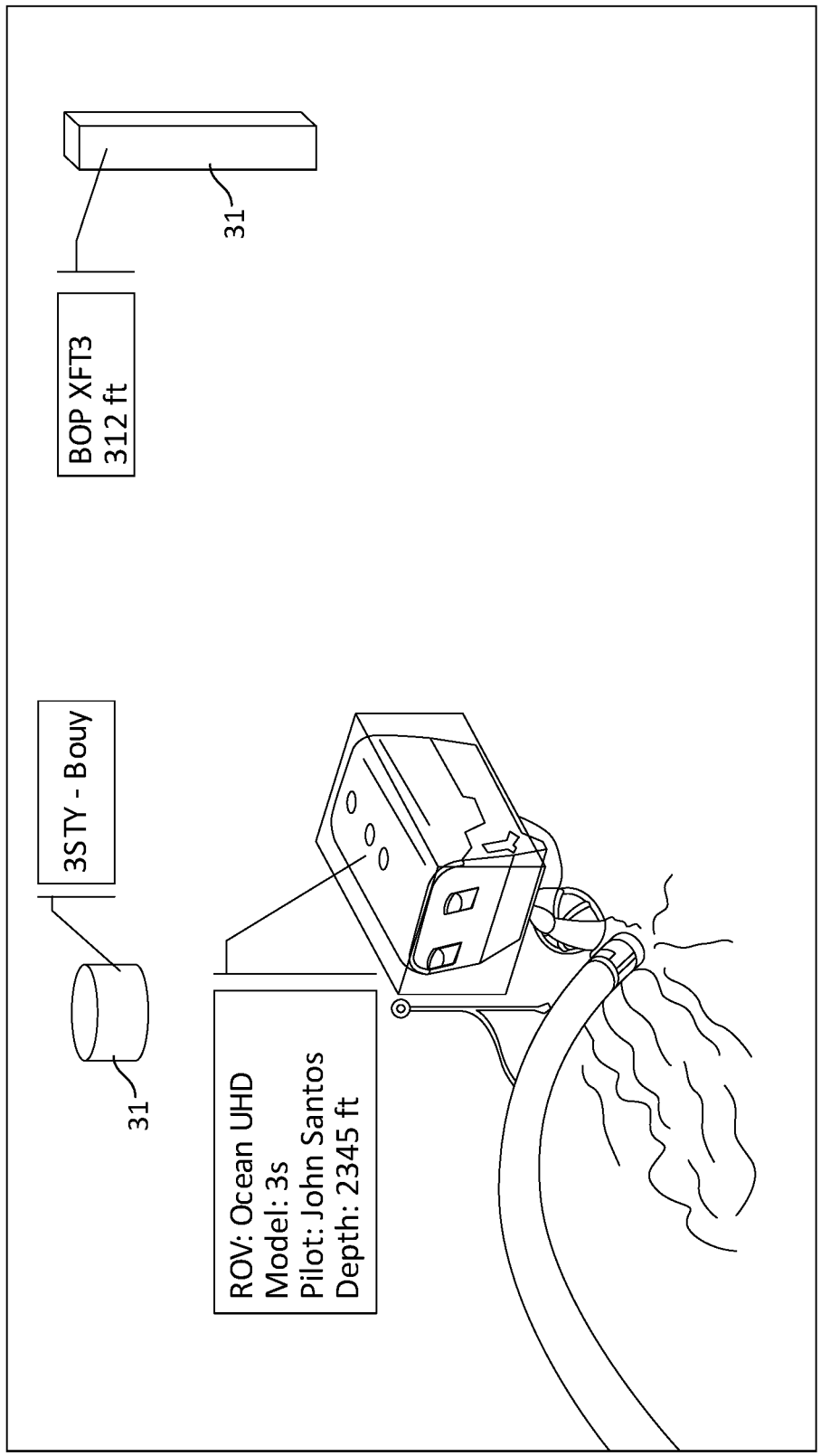

FIG. 6A illustrates the superposition of textual information and symbols 30 onto the 2D video rendering of the ROV user interface. FIG. 6B illustrates the superposition of 3D elements 31 onto the video rendering. The superposition of these data onto the video feed is useful, not only for navigating and controlling the ROV 1, but also for executing the related planning and supervising functions of the operating system 3. This superposition may be accomplished in a similar way to the superimposition of the video feeds, i.e., by obtaining screen coordinates of an object, and rendering text and numbers near those coordinates.

The planning module enables engineers and/or supervisors to plan one or several ROV missions. Referring again to FIG. 6A, an important feature of the planning module is the input and presentation of bathymetry information 32 through 3D visualization. As seen on the Navigation Interface, waypoints 33 and checkpoints 34 are superimposed onto the video feed. These elements may be identified, for example, by number, and/or by distance from a reference point. In other words, in addition to superimposing the technical specifications and status information 30 for the ROV 1 or other relevant structures, the Navigation Interface also provides GPS-determined positions for navigation and pilot information.

In some embodiments, procedures 35, including timed procedures (fixed position observation tasks, for example), may be included on the Navigation Interface as text. Given this procedural information, a ROV pilot is enabled to anticipate and complete tasks more accurately. A user may also use the system to define actionable areas. Actionable areas are geopositioned areas in the undersea environment that trigger a system action when entering, leaving, or staying longer than a designated time. The triggered action could be an alarm, notification, procedure change, task change, etc.

Figure 6C:
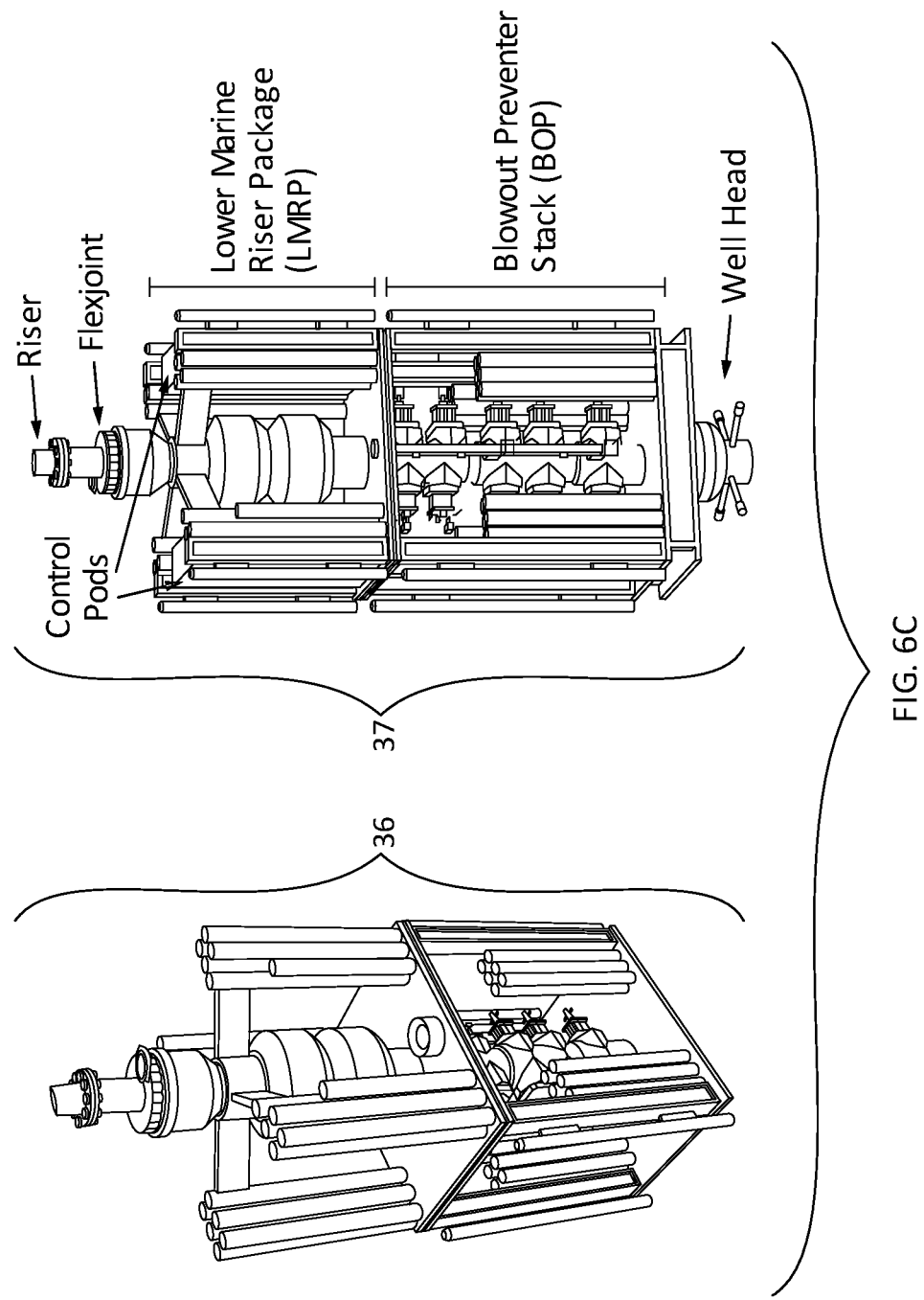

Referring to FIG. 6C, using a series of rules established in the planning module, or by manual input, the system may show more or less 2D geo-tagged information on the Navigation Interface. For example, as seen at 36, during a ROV operation when the pilot is at 100 meters from a geo-tagged object, the system may show only general information relating to the overall structure, or specific information needed for a specific current task in the nearby area. As the pilot approaches the geo-tagged structure, shown at 37, the system may incrementally show more information about components of that structure. This dynamic and manual level of detail control may apply to both textual and symbolic information 30, as well as to the augmentation of 3D elements 31.

Figure 6D:
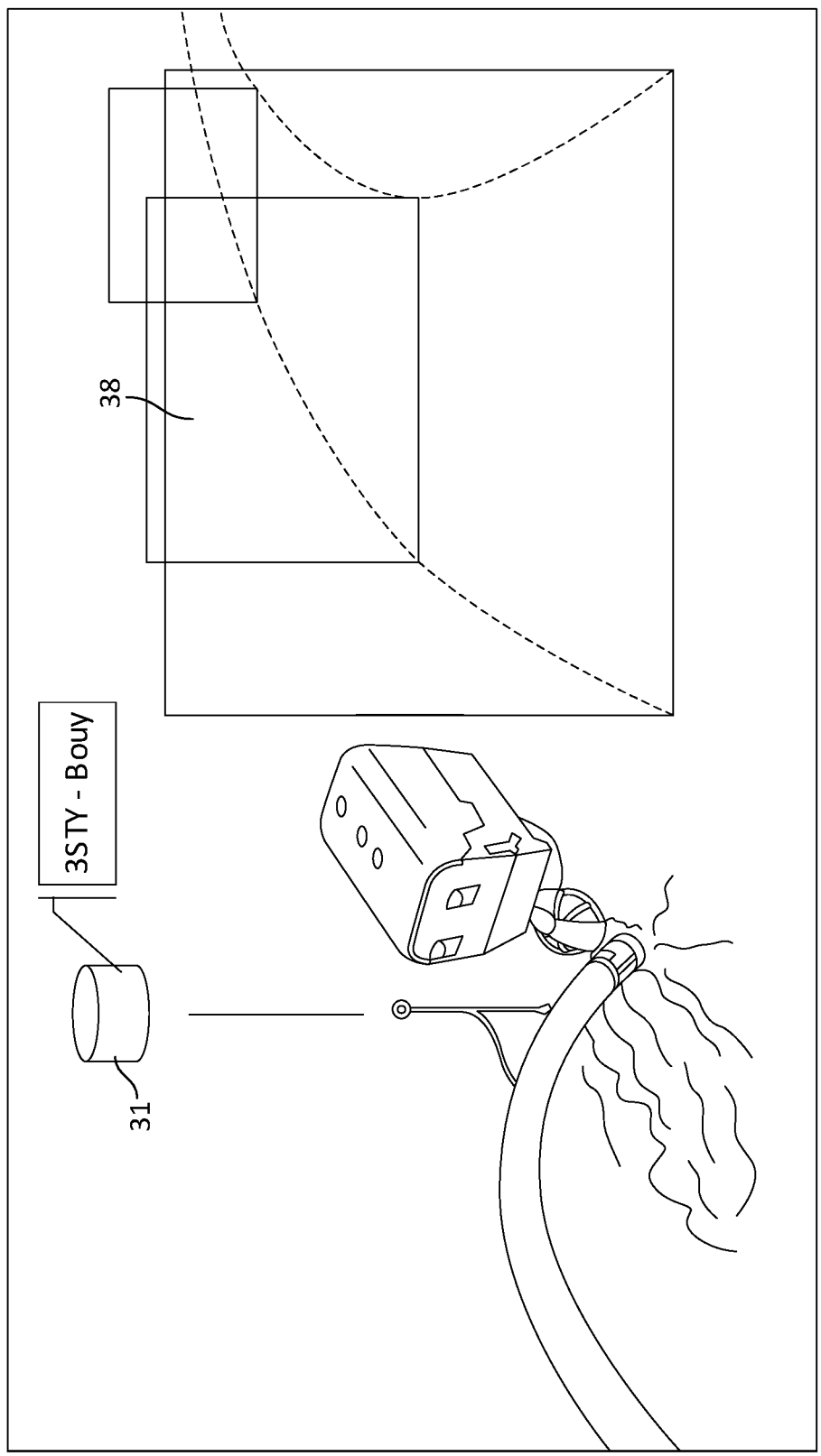
Figure 6E:
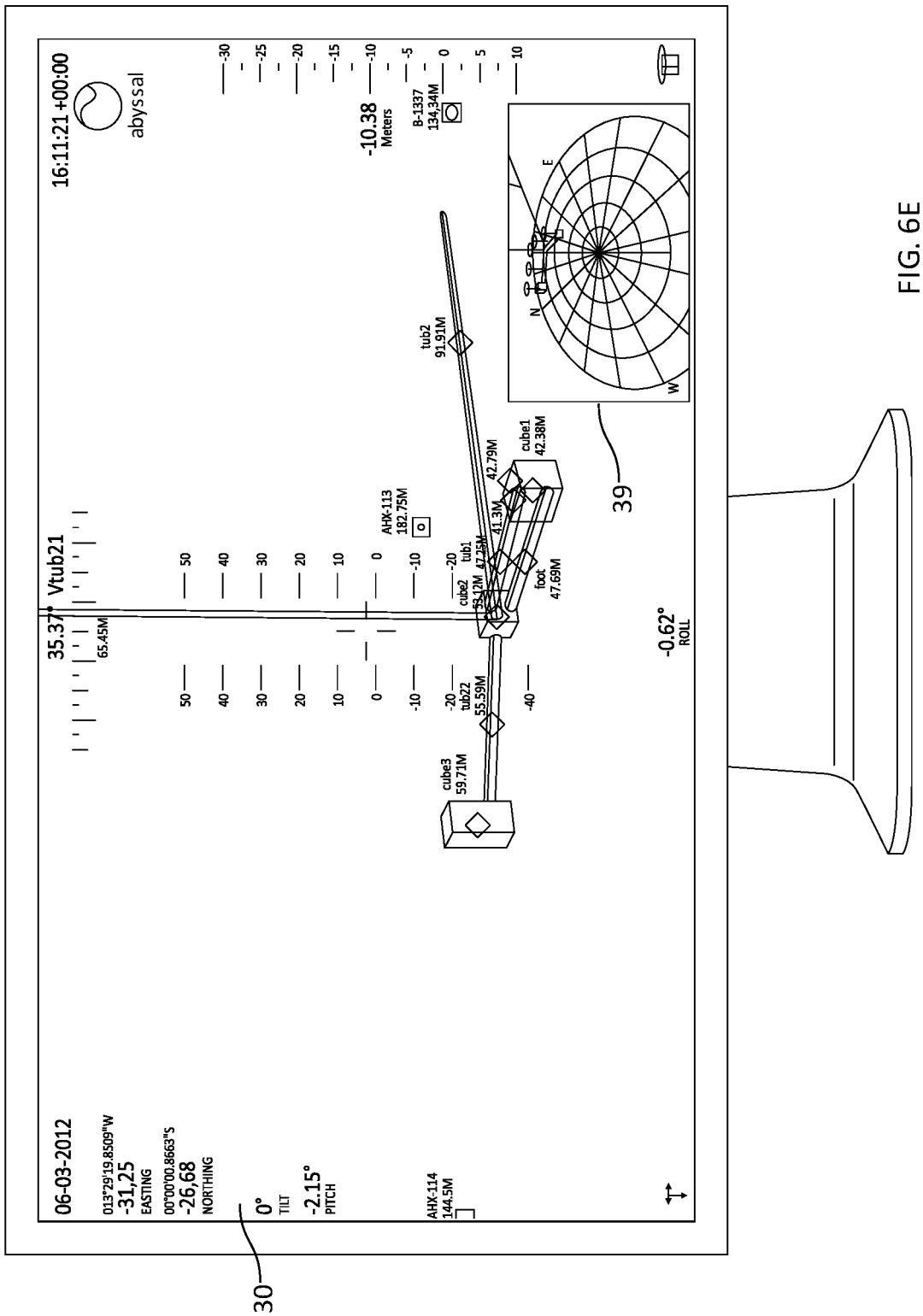

With reference to FIG. 6D, the planning module may also provide on-screen information relating to flight path 38. As seen in FIG. 6E, another important feature of the invention is embodied by a minimap 39, i.e., a graphic superimposed on the video, which may include a variety of different representations, such as small icons representing target objects. The minimap 39 may show the cardinal points (North, South, East, West) in a 3D representation, optionally in addition to a representation of a relevant object in tridimensional space. The minimap 39 may be positioned in a corner, and may be moved, dismissed and recalled by the user.

Data Engine

The data engine, which mediates the data warehousing and data transfer functions of the invention, therefore incorporates the logging and supervising modules.

The logging module logs or records all information made available by the operating system and saves such data in a central database for future access. The available information may include any or all telemetry, sonar data, 3D models, bathymetry, waypoints, checkpoints, alarms or malfunctions, procedures, operations, and navigation records such as flight path information, positioning and inertial data, etc.

An essential part of any offshore operation providing critical data to the client after the operation is concluded.

After the operation, during the debriefing and reporting stage, the debriefing and reporting module may provide a full 3D scenario or reproduction of the operation. The debriefing and reporting module may provide a report on the planned flight path versus the actual flight path, waypoints, checkpoints, several deviations on the plan, alarms given by the ROV, including details of alarm type, time and location, procedures, checkpoints, etc. ready to be delivered to the client. Accordingly, the operating system is configured to provide four-dimensional (three spatial dimensions plus time) interactive reports for every operation. This enables fast analysis and a comprehensive understanding of operations.

Yet another software element that interacts with of the Navigation Interface is the supervisor module. Execution of the supervisor module enables one or more supervisors to view and/or utilize the Navigation Interface, and by extension, any ROV 1 being controlled from the interface. These supervisors need not share the location of the ROV pilot or pilots, but rather may employ the connectivity elements depicted in FIGS. 3B and 3C. A plurality of multi touch supervision consoles may be used at different locations. For example, one could have nine monitors connected to three exemplary hardware structures, including an ROV 1, where only one operating system 3 gathered the ROV data and shared information with the others. Alternatively, between one and 12 networked monitors may be used, and preferably between 3 and 9 may be used. Networking provided as shown in FIGS. 3B and 3C may reduce risks, such as human error, in multiple-ROV operations, even those coordinated from separate vessels. Networking through the supervisor module allows for the sharing of information between ROV systems, personnel and operations across the entire operation workflow.

Position Estimation Engine

As discussed herein with respect to FIGS. 1B and 3A, the operating system's 3 visualization engine further includes modules for implementing 3D imagery, implementing 2D imagery, and providing a real-time environment update. These modules are shown in FIG. 4, which illustrates how the system operates in some embodiments to create superimposed hybrid 3D imagery using a 3D database module 10, a virtual video generation module 11, a synchronization module 12, and a superimposition module 13.

According to some embodiments, yet another feature of the operating system 3 is the position estimation engine that includes more efficiently aligning the virtual elements with the real elements while, at the same time, obtaining a more robust and efficient estimate of the ROV's position. In some embodiments, the position estimation engine works with the virtual video generation module 11 and the synchronization module 12 (e.g., using the generated virtual video 20 and the synchronized, real-time video 21 acquired by the ROV's digital camera). In some embodiments, the position estimation engine may update the bearing, heading, and ROV depth values (e.g., as discussed herein with respect to FIG. 5A) This is further described and shown with respect to FIG. 7, which illustrates how the system operates in some embodiments to efficiently improve position estimation.

Figure 7:
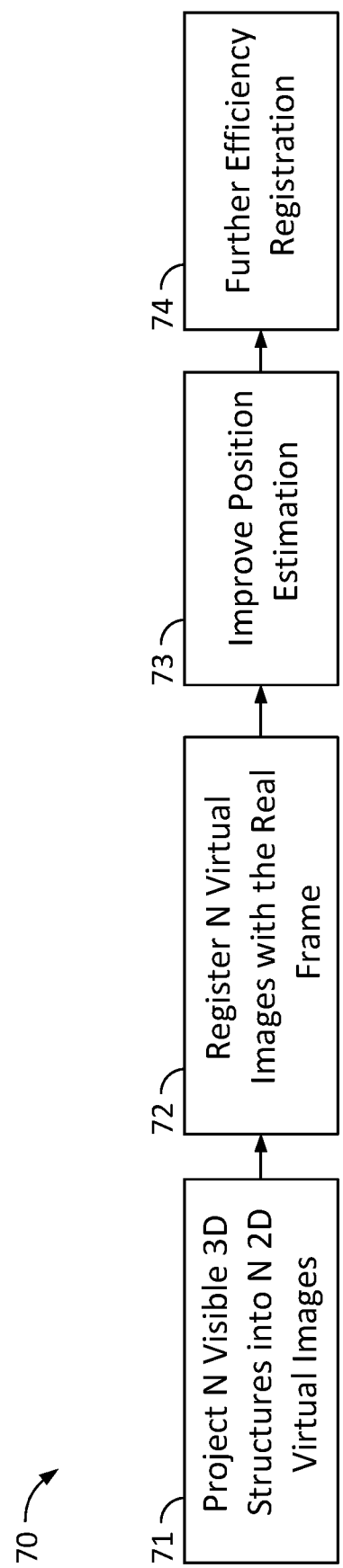
FIG. 7 depicts a position estimation engine for achieving efficient position estimation, and a method for its use, according to some embodiments of the inventions.

In some embodiments, as shown in FIG. 7, a position estimation engine 70 is illustrated that includes a 2D projection module 71, a registration module 72, a position estimation module 73, and an efficiency module 74. The improved position estimation starts with a real frame from the video and virtual image that is the projection of the 3D elements given the ROV's noisy position. The position estimate begins by projecting each of the visible structures individually and then registers them with the real image. Then the 2D transformation resulting from the registration process is used to estimate the 3D ROV's position. Then, the ROV's position estimate are robustly combined. Because this position estimation needs to run in real-time or near real-time, an efficiency module 74 is used to improve the efficiency of the position estimation.

A positional sensor (such as the sensor providing live information obtained by the ROV's 1 multibeam 3D real-time sonar, telemetry data, positioning data and/or video as shown and described with respect to FIG. 1B), despite being noisy, provides a good first estimate of the ROV's position. In some embodiments, it is assumed that the projection of the 3D structures in 2D (virtual image) is close to reality and, therefore, the system can search in the vicinity of the 3D structures for the real structures in the video. Then, the system can register each of the visible 3D structures with the real video independently. This registration can be performed at each frame of the video. However, in some embodiments, the registration may be prohibitively computationally expensive for a real time scenario, unless efficiency is improved as discussed below with respect to the efficiency module 74.

A 2D projection module 71 projects each of the N visible 3D structures into N 2D virtual images. However, problems may arise if 3D structures are not fully visible in the virtual image. As examples, there are at least three situations where the 3D structures are not fully visible in the virtual image: 1) the real structure is, in fact, not fully visible in the real image; 2) the ROV's positional noise incorrectly causes the projection of the structure to lie outside the image; and 3) both of the above. The second and third situations are described further herein with respect to FIGS. 8A and 8B. If important points are incorrectly projected outside the image, the registration process (e.g., the registration process described herein with respect to registration module 72) may be negatively impacted.

Figure 8B:
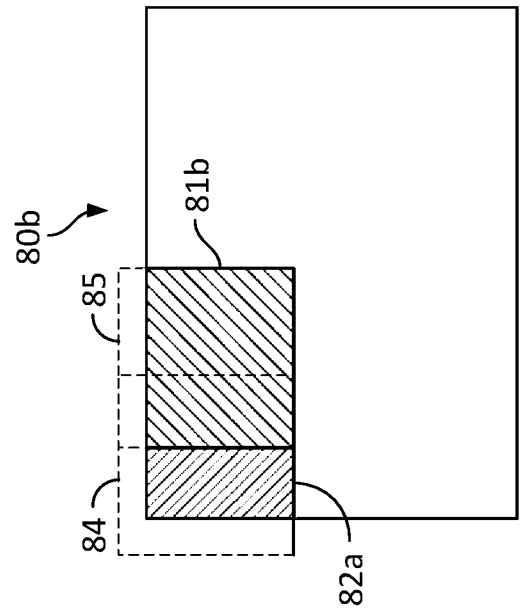
FIG. 8B depicts an example of a misalignment between the real and virtual images.
Figure 8A:
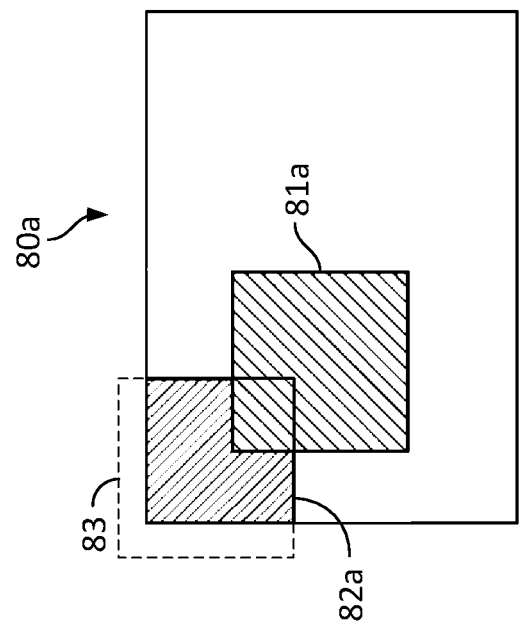
FIG. 8A depicts an example of a misalignment between the real and virtual images.

FIGS. 8A and 8B depict examples of a misalignment between the real and virtual images FIG. 8A depicts a 2D virtual image 80*a* containing a real structure 81*a* and a 3D structure projection 82*a* with a section 83 that is not visible in the virtual image 80*a*. Section 83 is part of the 3D structure projection 82*a* that is not visible because it is projected outside the image (e.g., because the ROV's positional noise incorrectly causes the projection to lie outside the real structure). The parts of the 3D structure projection 82*a* that are projected inside the real structure 81*a* may be insufficient to determine if the scale is correct. FIG. 8B depicts a 2D virtual image 80*b* containing a real structure 81*b* with a section 85 that is not visible in the virtual image 80*b* and a 3D structure projection 82*b* with a section 84 that is not visible in the virtual image 80*b*. Thus, in FIG. 8B, both the real and virtual objects lie partially outside the field-of-view of the virtual image 80*b*.

To mitigate problems where 3D structures are not fully visible in the virtual image, the field-of-view of the virtual image may be increased. Therefore, points that would not be included using the same field-of-view as the real camera may be included. A visual example of this process is depicted in FIG. 9.

Figure 9:
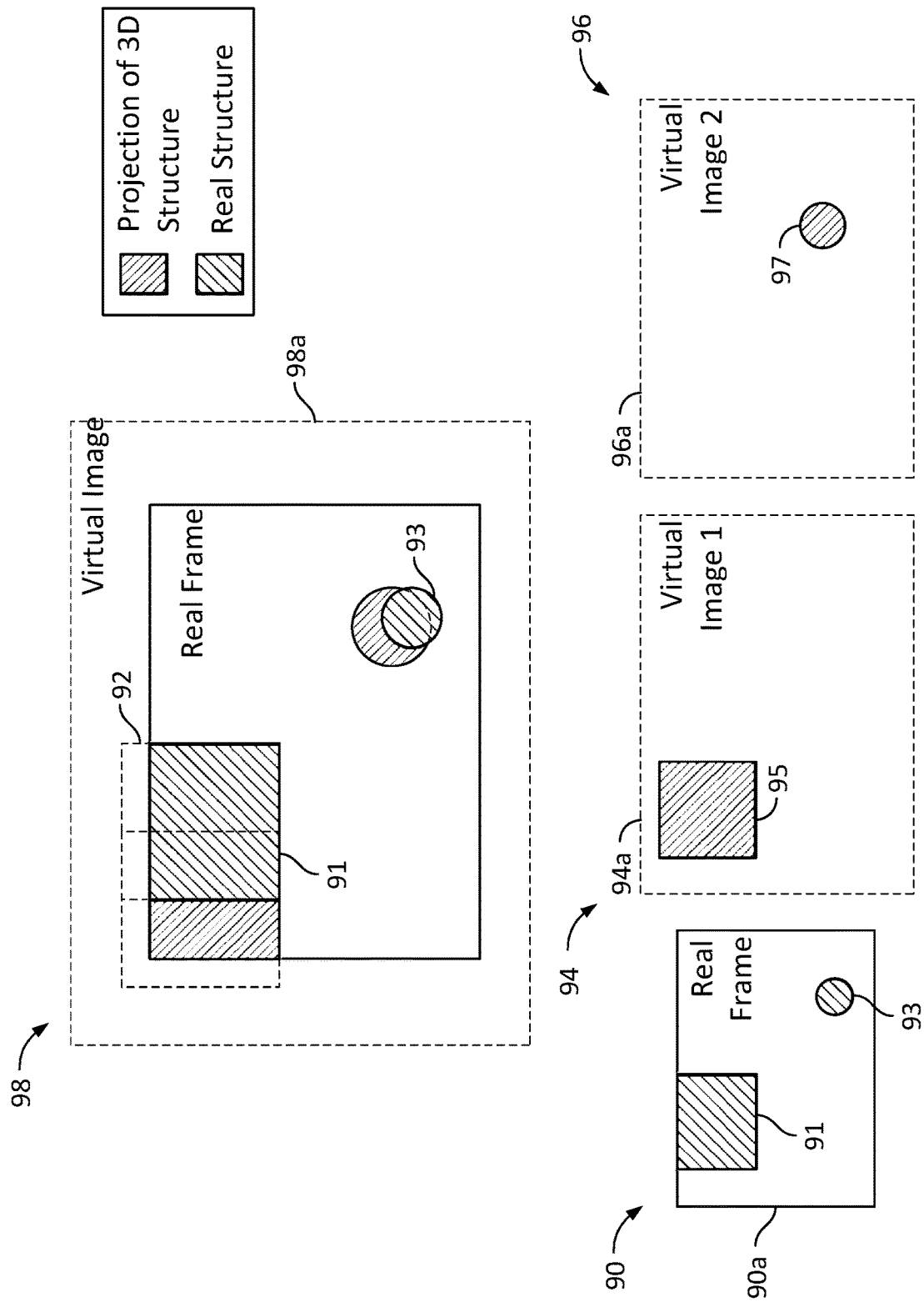
FIG. 9 illustrates an overlapped frame, a real frame, a first virtual image, and a second virtual image.

FIG. 9 illustrates a real frame 90 with a field-of-view 90*a* containing a first real structure 91 with a section 92 that would not be visible in the field-of-view 90*a* of real frame 90 and a second real structure 93, a first virtual image 94 with a field-of-view 94*a* and containing a first 3D structure 95 with a section that would not be visible in the field-of-view 90*a* of real frame 90, a second virtual image 96 with a field-of-view 96a and containing a second 3D structure 97, and a third virtual image 98 with a field-of-view 98a. As shown in FIG. 9, to mitigate problems where 3D structures are not fully visible in the virtual image, virtual objects (e.g., the first 3D structure 95 and the second 3D structure 97) are projected into a virtual image (e.g., the third virtual image 98) with a larger field of view than the real frame. Thus, parts of the objects that would be left out of the image (e.g., section 92), for example due to noise in the ROV's sensors, are included in the registration process.

After the 2D projection module 71 projects into 2D, the registration module 72 has N virtual images to register with the real frame. In some embodiments, the registration module 72 starts by extracting edges from both the real and virtual images. The registration module 72 may use different edge detection methods. In some embodiments, for example where it is important to perform in real-time or near real-time, the registration module 72 may extract horizontal and vertical gradients from the real and virtual images. Then, the results may be thresholded to obtain two binary edge maps.

The registration module 72 may use the binary edge maps to register the images. In some embodiments, the registration module 72 may use a variation of the Iterative Closest Point (ICP) algorithm (e.g., due in part to the assumption that the two images will be almost correctly aligned) to account for differences in scale. For each 2D point in the virtual edge map, the registration module 72 finds the closest point in the real edge map. Then, the registration module 72 finds the similarity transformation matrix $S_i$ that maps the virtual edge points to the corresponding real edge points. In some embodiments, the registration module 72 obtains the similarity transformation matrix $S_i$ in a closed form using Umeyama's method. The registration module 72 applies the transformation matrix to the points in the virtual edge map and, as in the ICP method, repeats the process until the transformation matrix is close to the identity or it exceeds the maximum number of iterations.

In some embodiments, for each structure $I=[x_{i1}, \ldots, x_{iK}]$, the registration module 72 applies the similarity transformation matrix $S_i$ to the set of structure's 2D points $x_i$ resulting in the new position $x'_i$:

$$x'_i = S_i.x_i.$$

In some embodiments, a similarity transformation matrix is used instead of a rigid body transformation because the virtual objects might be projected at a different distance from the camera than in reality. Because closer objects look bigger in an image, sizes may need to be increased or decreased to achieve a proper alignment.

After the registration module 72 produces a matrix (e.g., the similarity transformation matrix $S_i$) for each of the N visible 3D structures, this transformation registers the N virtual images with the real frame. However, the new projected 2D location of the structures might be inconsistent with the model of the world, for example due to noise in the registration process. In other words, if these structures were back-projected into 3D, their position can potentially be incorrect. Moreover, in some embodiments, the field structures are static and only the ROV moves. Thus, a position estimation module 73 may use these 2D similarity transformations to update the ROV's 3D position, thus reducing the ROV sensor's positional noise. If P is the known 3×4 projection matrix, and $X_i$ is the 3D homogeneous coordinates of structure I, then:

$$x = P.X_i, \quad x'_i = S_i.x_i.$$

Therefore, because P is the dot product between the camera's intrinsic parameters and the camera's position which, in this case, is the ROV's position, the position estimation module 73 may determine a rigid body transformation $T_i$ such that:

$$x'_i = P.T_i.X_i$$

The position estimation module 73 may determine $T_i$ in closed form by back-projecting $x'_i$ into 3D:

$$P^+.x'_i = T_i.X_i$$

where $P^+$ is the pseudo-inverse of P.

The position estimation module 73 may update the ROV's position by right multiplying its previous position with $T_i$. However, a problem may arise where the position estimation module 73 ends up with N different position estimates for the ROV. Thus, the position estimation module 73 may remove outlier positions and set the new ROV position to be the mean of the remaining estimated positions. After this process, the position estimation module 73 may render the 3D structures from the new ROV position.

Figure 10:
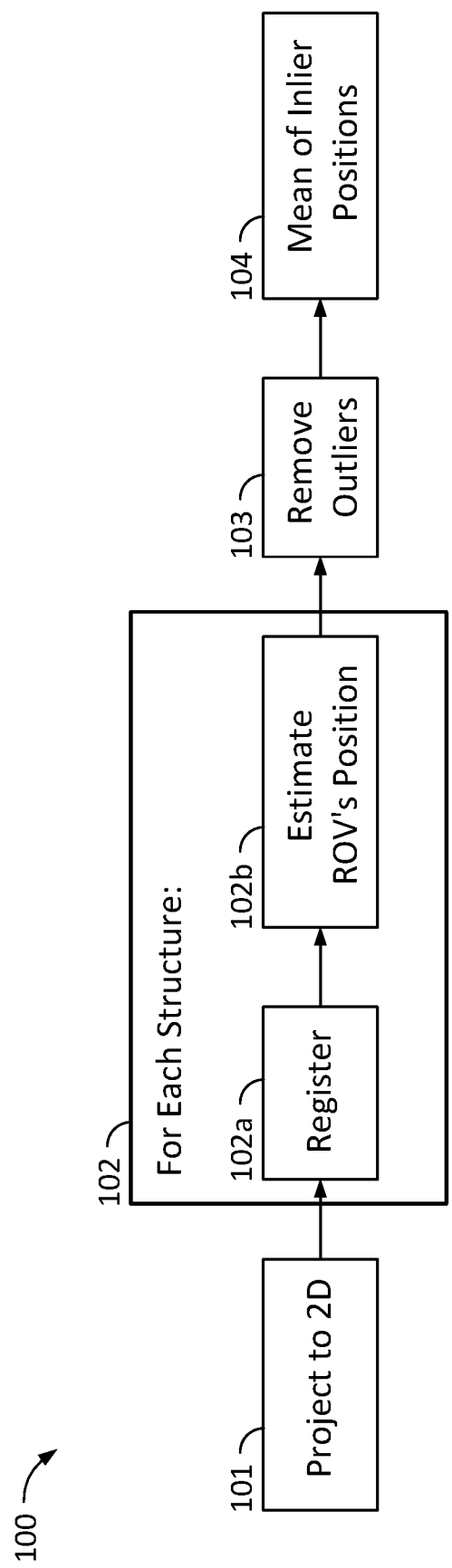
FIG. 10 depicts an overview of a method of using the position estimation module to improve a position estimation.

FIG. 10 depicts an overview of a method of using the position estimation module to improve a position estimation. FIG. 10 illustrates a method 100 for improving (e.g., by denoising) a position estimation by aligning the 3D scene with reality. Method 100 includes block 101 where images are projected onto 2D (e.g., as described herein with respect to projection module 71 and with respect to FIGS. 7, 8A, 8B, and 9). Method 100 includes block 102 and 102a where, for each structure, the images are registered (e.g., as described herein with respect to registration module 72). Method 100 includes block 102b where, for each structure, an improved position estimate is determined (e.g., as described herein with respect to position estimation module 73). Method 100 includes block 103 where the outlier positions are removed and block 104 where the position estimation is set to be the mean of inlier positions.

In some embodiments, an efficiency module 74 may be used. The most computationally expensive part of the disclosed embodiments is the registration module 72 and its usage of an iterative process to find point correspondences. The efficiency module 74 may further improve efficiency by saving the point matches used for the registration and then tracking them in the following real and virtual frames. Because the tracking may deteriorate with time, the efficiency module 74 may use a full registration process for a given structure in various circumstances. For example, the efficiency module 74 may use the full registration process for a given structure (i) when a sufficient or predetermined number of points being tracked are lost on either the virtual or real frame, (ii) after k frames, or (iii) when the structure enters the image for the first time. [The efficiency module 74 may keep track of point correspondences between $x'_i$ and $x_i$. When these point correspondences are not available, a full registration process may include extracting features (e.g., edge features) and using the ICP method to register the real and virtual structures. In some embodiments, the feature extraction and ICP method may be computed at block 102a. This is a technical solution that increases efficiency because these are the most time-consuming tasks in the process. By using the efficiency module 74, these point correspondences do not need to be computed.

In some embodiments, the full registration process may be too slow to run at the desired speed (e.g., greater than 20 times per second). This means the estimations may come either too late to be useful or may need adaptation. The efficient registration process runs much faster but uses data provided by the full registration process and may need to refresh the full process at some point. Consequently, in some embodiments, the efficiency module 74 may initially use the full registration process for a period of time (e.g., up to a few seconds) and then use the efficient process to provide an accurate position estimate per-frame (or very close to per-frame). This may be done on a per-structure basis. As an example only, if three structures were on screen, method 100 could run the efficient process for two of the structures—and estimate the ROV positions from those two structures— while the third structure is still being initialized.

Thus, there has been shown and described a system and method relating to improved position estimation of ROVs. The method and system are not limited to any particular hardware or software configuration. The many variations, modifications and alternative applications of the invention that would be apparent to those skilled in the art, and that do not depart from the scope of the invention are deemed to be covered by the invention.

What is claimed is:

1. A system for operating a remotely operated vehicle (ROV) comprising:
 a database module of 3D elements operable to represent objects disposed in an operation environment of the ROV;
 a virtual video generating module operable to generate a virtual video incorporating the 3D elements;
 a video camera mounted to the ROV operable to capture a real video of the operation environment of the ROV;
 a synchronizing module operable to synchronize an angle and position of a virtual camera with an angle and position of the video camera mounted to the ROV, wherein the virtual camera defines a field of view for the virtual video; and
 a position estimation engine operable to align a virtual video element with a real video element to create hybrid 3D imagery and generate a ROV position estimation, the position estimation engine comprising:
 a projection module;
 a registration module;
 a position estimation module; and
 an efficiency module.

2. The system of claim 1, wherein the projection module is operable to project visible 3D structures into a corresponding 2D virtual image with a 2D virtual image field-of-view, and wherein each of the visible 3D structures is projected into its corresponding 2D virtual image.

3. The system of claim 2, wherein the 2D virtual image field-of-view is larger than the field of view for the virtual video.

4. The system of claim 3, wherein the projection module generates N virtual images.

5. The system of claim 4, wherein the registration module registers the N virtual images with N real frames from the real video.

6. The system of claim 5, wherein the registration module determines edge maps to register the N virtual images.

7. The system of claim 6, wherein the registration module maps at least one virtual edge point to at least one corresponding real edge point with a similarity transformation matrix.

8. The system of claim 7, wherein the registration module generates the similarity transformation matrix in a closed form using Umeyama's method.

9. The system of claim 8, wherein the registration module applies the similarity transformation matrix in an iterative process until the similarity transformation matrix is close to identity or exceeds a maximum number of iterations.

10. The system of claim 9, wherein the position estimation module generates the ROV position estimation based at least in part on the N virtual images of the projection module and the similarity transformation matrix of the registration module.

11. The system of claim 10, wherein the position estimation module determines a rigid body transformation Ti.

12. The system of claim 11, wherein the position estimation module generates a new ROV position estimation by right multiplying a previous ROV position estimation with Ti.

13. The system of claim 12, wherein the position estimation module renders 3D structures from the new ROV position estimation.

14. The system of claim 13, wherein, before rendering the 3D structures from the new ROV position estimation, the position estimation module removes outlier position estimations to generate a set of remaining position estimations and determines an updated ROV position estimation comprising a mean of the set of remaining position estimations.

15. The system of claim 1, wherein the efficiency module uses a full registration process for a specific structure when (i) a predetermined number of virtual edge points or real edge points are lost, (ii) after a predetermined number of frames, (iii) or when the specific structure enters the real video for a first time.

16. A method of operating a remotely operated vehicle (ROV) comprising:
 obtaining 3D bathymetry data using multibeam sonar;
 storing 3D elements in a database module, the 3D elements representing objects disposed in the ROV's operation environment and comprising the 3D elements comprising the 3D bathymetry data;
 generating a virtual video of the 3D elements;
 synchronizing an angle and position of a virtual camera with an angle and position of a video camera mounted to the ROV, wherein the virtual camera defines a field of view for the virtual video; and
 aligning a virtual video element with a real video element to create hybrid 3D imagery, wherein aligning comprises:
 projecting visible 3D structures into a corresponding 2D virtual image with a 2D virtual image field-of-view;
 generating N virtual images;
 registering the N virtual images with a real frame from the real video; and generating a ROV position estimate based at least in part on the corresponding 2D virtual image and the registered N virtual images.

17. The method of claim 16, further comprising using a full registration process for a specific structure.

18. The method of claim 16, further comprising:
 mapping virtual edge points to corresponding real edge points;
 applying an iterative process to the mapping; and
 generating a ROV position estimation.

19. The method of claim 18, further comprising rendering 3D structures from the ROV position estimation.

20. The method of claim 19, wherein generating an 3D position estimation further comprises:
 removing outlier position estimations;
 generating a set of remaining position estimations; and
 determining an updated ROV position estimation comprising a mean of the set of remaining position estimations.

21. A computer program product comprising instructions which, when the program is executed by a computer, cause the computer to carry out the steps of claim 16.

\* \* \* \* \*